US012768422B2

(12) United States Patent
Tanaka et al.

(10) Patent No.: US 12,768,422 B2
(45) Date of Patent: Oct. 20, 2026

(54) ROTARY DAMPER AND PRODUCTION METHOD THEREFOR

(71) Applicant: SOMIC MANAGEMENT HOLDINGS INC., Tokyo (JP)

(72) Inventors: Katsumi Tanaka, Hamamatsu (JP); Keigo Ozaki, Brewer, ME (US)

(73) Assignee: SOMIC MANAGEMENT HOLDINGS INC., Tokyo (JP)

( * ) Notice: Subject to any disclaimer, the term of this patent is extended or adjusted under 35 U.S.C. 154(b) by 415 days.

(21) Appl. No.: 18/289,085

(22) PCT Filed: Jul. 3, 2021

(86) PCT No.: PCT/JP2021/025228

§ 371 (c)(1),
(2) Date: Oct. 31, 2023

(87) PCT Pub. No.: WO2023/281554

PCT Pub. Date: Jan. 12, 2023

(65) Prior Publication Data

US 2024/0218913 A1 Jul. 4, 2024

(51) Int. Cl.
*F16F 9/14* (2006.01)

(52) U.S. Cl.
CPC .......... *F16F 9/145* (2013.01); *F16F 2226/04* (2013.01); *F16F 2230/0052* (2013.01); *F16F 2230/30* (2013.01)

(58) Field of Classification Search
None
See application file for complete search history.

(56) References Cited

U.S. PATENT DOCUMENTS 5,988,329 A * 11/1999 Evans, Jr. ............... F16F 9/145 188/313
8,516,657 B2 8/2013 Yoshida
2014/0048363 A1* 2/2014 Ozaki ..................... F16F 9/145 188/296

(Continued)

FOREIGN PATENT DOCUMENTS

JP 2017115996 A * 6/2017
JP 2019-082208 5/2019

(Continued)

OTHER PUBLICATIONS

JP-2017115996-A: English Machine Translation (Year: 2017).*
European Patent Application 21949192.5, Extended European Search Report dated Mar. 21, 2025.

*Primary Examiner* — Melanie Torres Williams
(74) *Attorney, Agent, or Firm* — COZEN O'CONNOR

(57) ABSTRACT

A rotary damper having a cylinder (10) with a partition wall (13); a rotor (20) having a shaft portion (21) opposing the partition wall; a first recess (16) formed on a distal end surface of the partition wall; an elastic body (40) installed in the first recess and closely contacting the shaft portion to seal a gap between the partition wall and the shaft portion; and a second recess (27) formed in a part of an outer peripheral surface of the shaft portion not opposing the distal end surface of the partition wall during operation, and forming a space (50) into which the elastic body can be inserted without being compressed by facing an opening of the second recess to an opening of the first recess during assembly.

4 Claims, 12 Drawing Sheets

(56) References Cited

U.S. PATENT DOCUMENTS

| | | | | |
|---|---|---|---|---|
| 2015/0014105 | A1* | 1/2015 | Sakuta ...................... | F16F 9/34 188/296 |
| 2017/0321780 | A1 | 11/2017 | Horita | |
| 2019/0331190 | A1* | 10/2019 | Watanabe ................. | F16F 9/36 |

FOREIGN PATENT DOCUMENTS

| | | |
|---|---|---|
| JP | 2021-021453 | 2/2021 |
| WO | WO 03/046405 | 6/2003 |
| WO | WO 2012/141242 | 10/2012 |
| WO | 2021100262 A1 | 5/2021 |

* cited by examiner

ROTARY DAMPER AND PRODUCTION METHOD THEREFOR

RELATED APPLICATION

This is a U.S. National Phase Application under 35 USC 371 of International Application PCT/JP2021/025228 filed on Jul. 3, 2021, the content of which is hereby incorporated by reference.

FIELD OF THE INVENTION

The present invention relates to a rotary damper and a method of manufacturing the rotary damper.

BACKGROUND OF THE INVENTION

Conventionally, a rotary damper comprising a cylinder having a partition wall and a rotor having a shaft portion opposing the partition wall is known. However, the conventional rotary damper has a problem that oil flows out from a gap between the partition wall and the shaft portion. The outflow of the oil from the gap between the partition wall and the shaft portion causes deterioration of characteristics of the rotary damper.

WO 2003/046405 A1 discloses a rotary damper comprising a cylinder having a partition wall, a rotor having a shaft portion opposing the partition wall, a vane protruding from the shaft portion, an oil passage formed in the vane, and a valve that changes a flow rate of oil passing through the oil passage in one direction according to a load. The rotary damper has characteristics that an operation time, that is, a time required for the rotor or the cylinder to rotate at a constant rotation angle hardly changes due to a change in load. However, there is a problem that the characteristics are deteriorated because the oil flows out from the gap between the partition wall and the shaft portion, so that a sufficient amount of oil for the valve to function is not supplied to the valve.

WO 2012/141242 A1 discloses a rotary damper comprising a cylinder having a partition wall, a rotor having a shaft portion opposing the partition wall, a vane protruding from the shaft portion, an oil passage formed in the vane, and a check valve provided in the oil passage. The rotary damper has characteristics that a braking force is generated only when the rotor is rotated in one direction. However, since the oil flows out from the gap between the partition wall and the shaft portion, there is a problem that the braking force decreases.

SUMMARY OF INVENTION

An object of the present invention is to prevent outflow of oil from a gap between a partition wall and a shaft portion and to facilitate attachment of an elastic body that seals the gap between the partition wall and the shaft portion.

In order to solve the above problems, the present invention provides, in a first embodiment, a rotary damper comprising: a cylinder having a partition wall; a rotor having a shaft portion opposing the partition wall; a first recess formed on a distal end surface of the partition wall; an elastic body installed in the first recess and closely contacting the shaft portion to seal a gap between the partition wall and the shaft portion; and a second recess formed in a part of an outer peripheral surface of the shaft portion not opposing the distal end surface of the partition wall during operation, and forming a space into which the elastic body can be inserted without being compressed by facing an opening of the second recess to an opening of the first recess during assembly.

The present invention is also directed to, in a second embodiment, a rotary damper comprising: a cylinder having a partition wall; a rotor having a shaft portion opposing the partition wall; a first recess formed in a distal end surface of the partition wall; an elastic body installed in the first recess and closely contacting the shaft portion to seal a gap between the partition wall and the shaft portion; a second recess formed in a part of an outer peripheral surface of the shaft portion not opposing the distal end surface of the partition wall during operation, and forming a space into which the elastic body can be inserted without being compressed by facing an opening of the second recess to an opening of the first recess during assembly; a vane protruding from the shaft portion; a first oil passage formed in the partition wall or the vane; and a valve that changes a flow rate of oil passing through the first oil passage in one direction according to a load.

The present invention is further directed to, in a third embodiment, a rotary damper comprising: a cylinder having a partition wall; a rotor having a shaft portion opposing the partition wall; a first recess formed in a distal end surface of the partition wall; an elastic body installed in the first recess and closely contacting the shaft portion to seal a gap between the partition wall and the shaft portion; a second recess formed in a part of an outer peripheral surface of the shaft portion not opposing the distal end surface of the partition wall during operation, and forming a space into which the elastic body can be inserted without being compressed by facing an opening of the second recess to an opening of the first recess during assembly; a vane protruding from the shaft portion; a first oil passage formed in the partition wall or the vane; a valve that changes a flow rate of oil passing through the first oil passage in one direction according to a load: a second oil passage formed in the partition wall or the vane in which the first oil passage is not formed; and a check valve provided in the second oil passage.

Lastly, the present invention is directed to, in a fourth embodiment, a method of manufacturing a rotary damper comprising a cylinder having a partition wall; a rotor having a shaft portion opposing the partition wall; a first recess formed on a distal end surface of the partition wall; an elastic body installed in the first recess and closely contacting the shaft portion to seal a gap between the partition wall and the shaft portion; and a second recess formed in a part of an outer peripheral surface of the shaft portion not opposing the distal end surface of the partition wall during operation, the method comprising the steps of forming a space consisting of a combination of the first recess and the second recess by facing an opening of the second recess to an opening of the first recess, and inserting the elastic body into the space without compression.

Advantageous Effects of Invention

The rotary dampers set forth above comprises the elastic body installed in the first recess and closely contacting the shaft portion to seal the gap between the partition wall and the shaft portion; and the second recess formed in a part of the outer peripheral surface of the shaft portion not opposing the distal end surface of the partition wall during operation, and forming the space into which the elastic body can be inserted without being compressed by facing the opening of the second recess to the opening of the first recess during assembly. Therefore, it is possible to prevent oil from flowing out from the gap between the partition wall and the shaft portion and to facilitate attachment of the elastic body.

According to the invention described in the second embodiment above, since the oil can be prevented from flowing out from the gap between the partition wall and the shaft portion as described above, it is possible to supply a sufficient amount of oil for the valve to function. Therefore, it is possible to reduce a width of the change in the operation time caused by the change in the load.

As described above, the rotary damper of the third embodiment can prevent the oil from flowing out from the gap between the partition wall and the shaft portion, so that it is possible to prevent a decrease in a braking force generated when the rotor is rotated in one direction. On the other hand, when the rotor rotates in an opposite direction, the oil can pass through the two oil passages, that is, the first oil passage and the second oil passage, so that the resistance of the oil acting on the rotor can be reduced.

The present invention described in the above fourth embodiment comprises the steps of forming a space consisting of a combination of the first recess and the second recess by facing the opening of the second recess to the opening of the first recess, and inserting the elastic body into the space without compression, so that the elastic body is easily attached.

DETAILED DESCRIPTION OF THE DRAWINGS

Hereinafter, embodiments of the present invention will be described with reference to the drawings.

Figure 1:
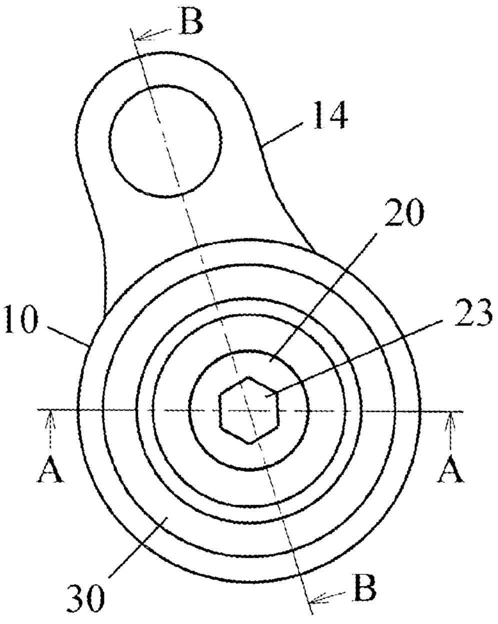
FIG. 1 is a plan view of a rotary damper according to an example.
Figure 9:
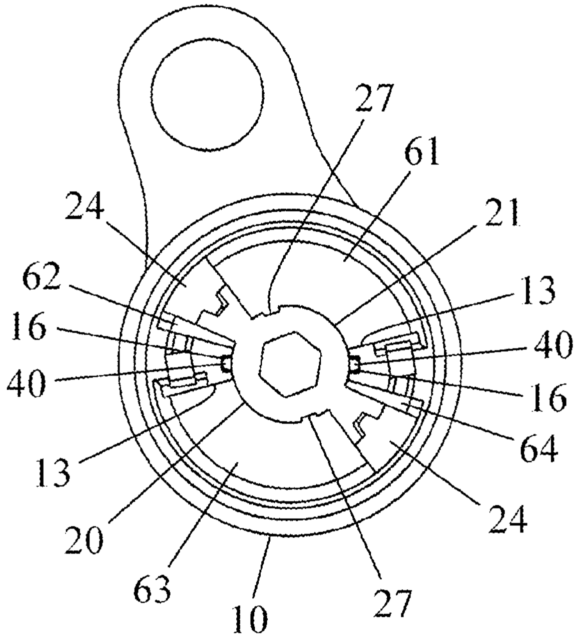
FIG. 9 is a cross-sectional view illustrating a state in which a vane is located at a start point of an operating range.

As illustrated in FIG. 1, a rotary damper according to an example comprises a cylinder 10 and a rotor 20. The cylinder 10 is a cylindrical component that accommodates oil therein. The rotor 20 is a rotating component. However, the rotor 20 may not rotate. The braking action when the cylinder 10 is fixed so as not to rotate and the rotor 20 is rotated in one direction, that is, a clockwise direction in FIG. 9 is the same as the braking action when the rotor 20 is fixed so as not to rotate and the cylinder 10 is rotated in an opposite direction, that is, a counterclockwise direction in FIG. 9.

Figure 2:
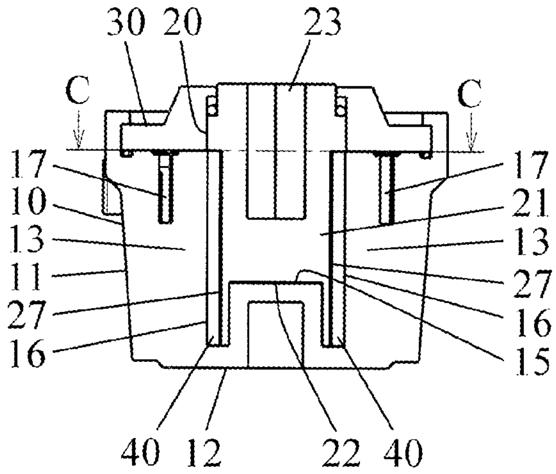
FIG. 2 is a cross-sectional view taken along line A-A of FIG. 1.
Figure 3:
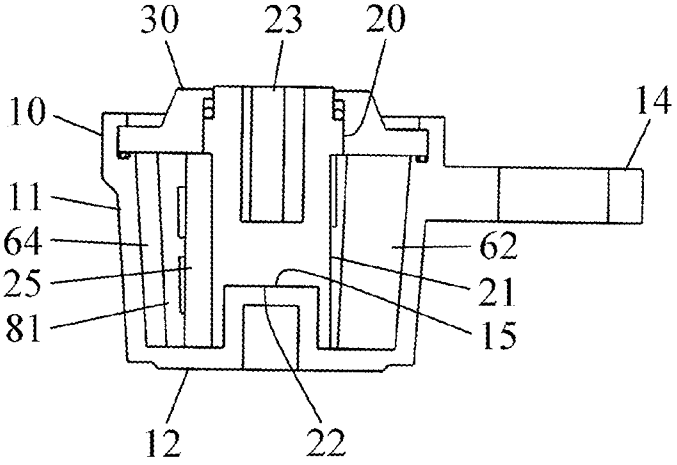
FIG. 3 is a cross-sectional view taken along line B-B in FIG. 1.
Figure 4:
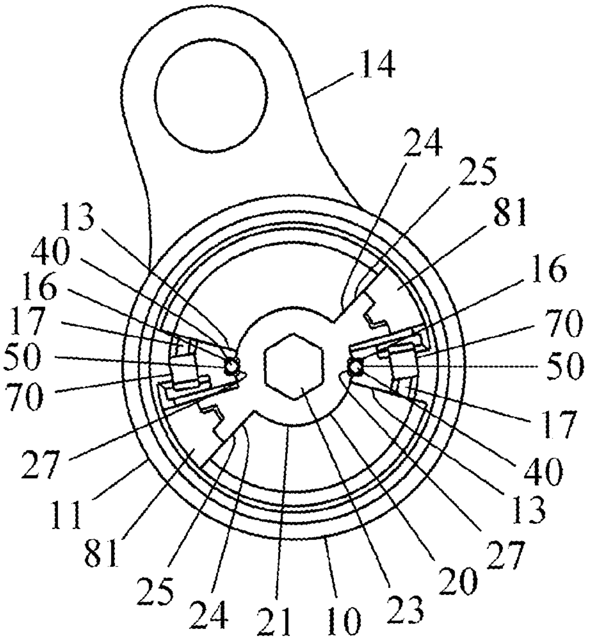
FIG. 4 is a cross-sectional view taken along line C-C in FIG. 2.
Figure 5:
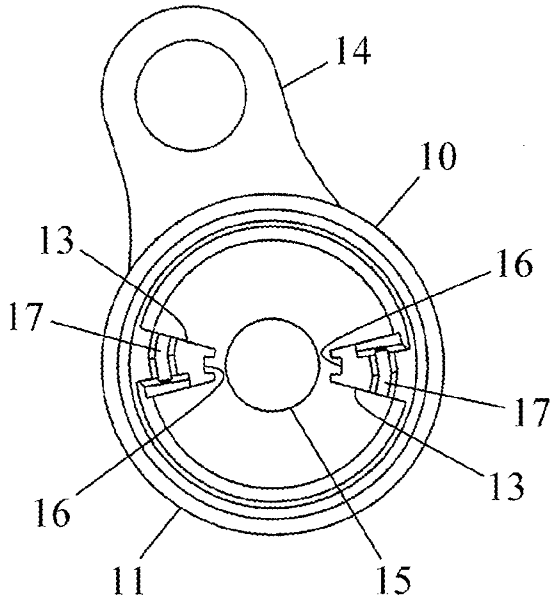
FIG. 5 is a plan view of a cylinder employed in an example.
Figure 10:
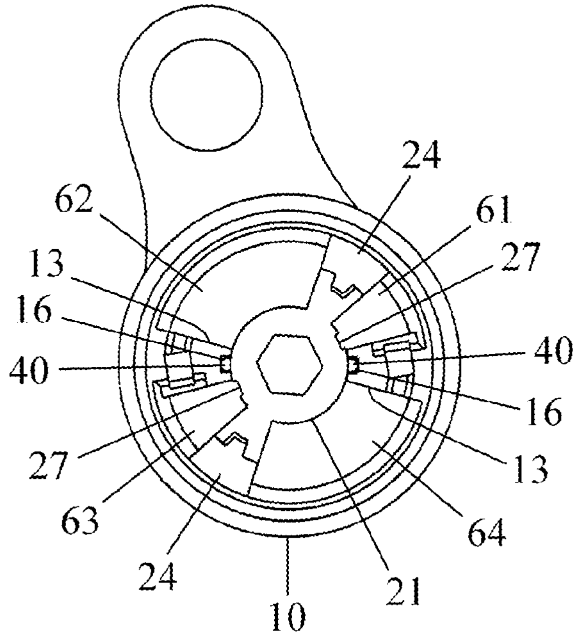
FIG. 10 is a cross-sectional view illustrating a state in which the vane is located at an end point of the operating range.

As illustrated in FIGS. 2, 3, 4, and 5, the cylinder 10 includes a peripheral wall 11, an end wall 12 that closes one end of the peripheral wall 11, and a partition wall 13 protruding from the peripheral wall 11 toward the center. As illustrated in FIGS. 1, 3, 4, and 5, the cylinder 10 includes a flange 14 protruding from the peripheral wall 11. The flange 14 is connected to an object that fixes the cylinder 10 so as not to rotate or an object that rotates the cylinder 10. As illustrated in FIGS. 1, 2, and 3, the other end of the peripheral wall 11 is closed by a lid 30. The lid 30 is attached to the cylinder 10 by caulking an end of the peripheral wall 11. As illustrated in FIGS. 2, 3, and 5, the cylinder 10 includes a protrusion 15 protruding from the end wall 12. As illustrated in FIGS. 2, 4, and 5, a first recess 16 is formed on a distal end surface of the partition wall 13. The first recess 16 is a seal groove, and as illustrated in FIGS. 9 and 10, an elastic body 40 functioning as a seal is installed in the first recess 16.

Figure 8:
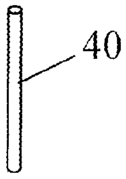
FIG. 8 is a perspective view of an elastic body employed in an example.

As illustrated in FIG. 8, the elastic body 40 employed in the example is a cylindrical rubber.

Figure 6:
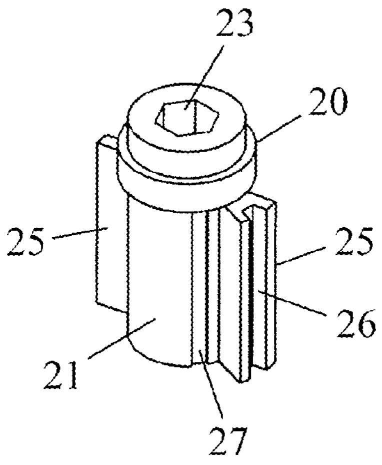
FIG. 6 is a perspective view of a rotor employed in an example.
Figure 7:
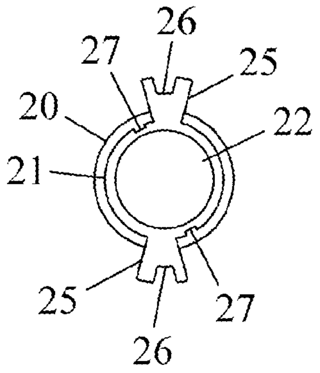
FIG. 7 is a bottom view of the rotor employed in the example.

As illustrated in FIGS. 2, 3, 4, 6, and 7, the rotor 20 includes a shaft portion 21 opposing the partition wall 13. As illustrated in FIGS. 1, 2, 3, and 4, the rotor 20 is installed so that the shaft portion 21 can rotate in the cylinder 10. As illustrated in FIGS. 2, 3, and 7, one end of the rotor 20 is formed with a first hole 22 that fits into the protrusion 15 formed on the cylinder 10. As illustrated in FIGS. 1, 2, 3, 4, and 6, the other end of rotor 20 is formed with a second hole 23 into which an object that rotates rotor 20 or an object that fixes rotor 20 so as not to rotate is inserted. As illustrated in FIG. 4, the rotor 20 includes a vane 24 protruding from the shaft portion 21. The vane 24 comprises a valve body 81 and a holding portion 25 that holds the valve body 81. As illustrated in FIGS. 6 and 7, a groove 26 is formed at a tip of the holding portion 25 integrally molded with the shaft portion 21. As illustrated in FIGS. 2, 4, 6, and 7, the second recess 27 is formed on an outer peripheral surface of the shaft portion 21.

In the rotary damper according to the example, an operating range of the vane 24, that is, a range in which the vane 24 can move when the rotary damper is used is set. FIG. 9 illustrates a state in which the vane 24 is located at a start point of the operating range, and FIG. 10 illustrates a state in which the vane 24 is located at an end point of the operating range. Since the operating range of the vane 24 is smaller than a movable range of the vane 24, that is, a range in which the vane 24 can move when the rotary damper is not used, a part of the outer peripheral surface of the shaft portion 21 does not oppose the distal end surface of the partition wall 13 when the rotary damper is operated. As illustrated in FIGS. 9 and 10, the second recess 27 is formed in a part of the outer peripheral surface of the shaft portion 21 that does not oppose the distal end surface of the partition wall 13 during operation.

As illustrated in FIGS. 9 and 10, the elastic body 40 is in close contact with the shaft portion 21 to seal a gap between the partition wall 13 and the shaft portion 21. Since the elastic body 40 is a cylindrical rubber, adhesion to the shaft portion 21 is good. However, in order to bring the elastic body 40 into close contact with the shaft portion 21, a radial length from the outer peripheral surface of the shaft portion 21 to a bottom of the first recess 16 needs to be shorter than a diameter of the elastic body 40. Therefore, in a case where the elastic body 40 is inserted into the first recess 16 in a state where the vane 24 is positioned within the operating range of the vane 24, it is necessary to compress the elastic body 40, and thus it is difficult to attach the elastic body 40.

Figure 11:
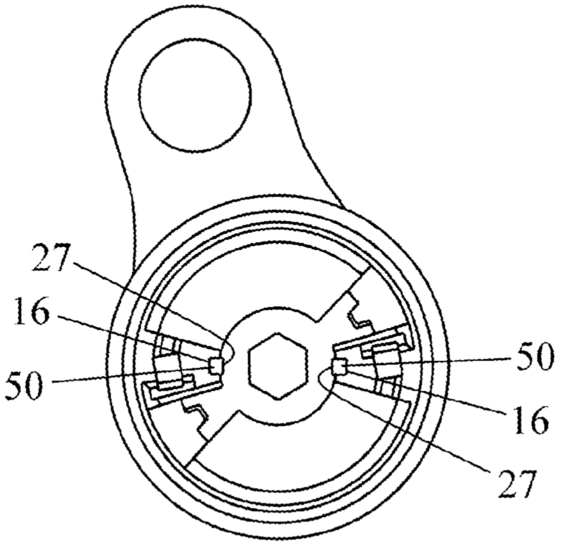
FIG. 11 is a cross-sectional view illustrating a space including a combination of a first recess and a second recess.

As illustrated in FIG. 11, the second recess 27 can form a space 50 into which the elastic body 40 can be inserted without being compressed by facing an opening of the second recess 27 to an opening of the first recess 16 at the time of assembly. The cross section of the space 50 has a width and a radial length (length from the bottom of the first recess 16 to the bottom of the second recess 27) larger than or equal to a diameter of the cross section of the elastic body 40. As illustrated in FIG. 4, in the rotary damper according to the example, the elastic body 40 can be inserted into the space 50 formed by a combination of the first recess 16 and the second recess 27 in a state where the vane 24 is positioned outside the operating range of the vane 24, so that the elastic body 40 can be easily attached.

As illustrated in FIG. 10, four oil chambers partitioned by the partition walls 13 and the vanes 24, that is, a first oil chamber 61, a second oil chamber 62, a third oil chamber 63, and a fourth oil chamber 64 are formed in the cylinder 10. Oil is injected into each of the oil chambers 61 to 64.

Figure 12:
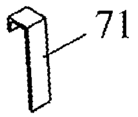
FIG. 12 is a perspective view of a valve body of a valve employed in an example.
Figure 13:
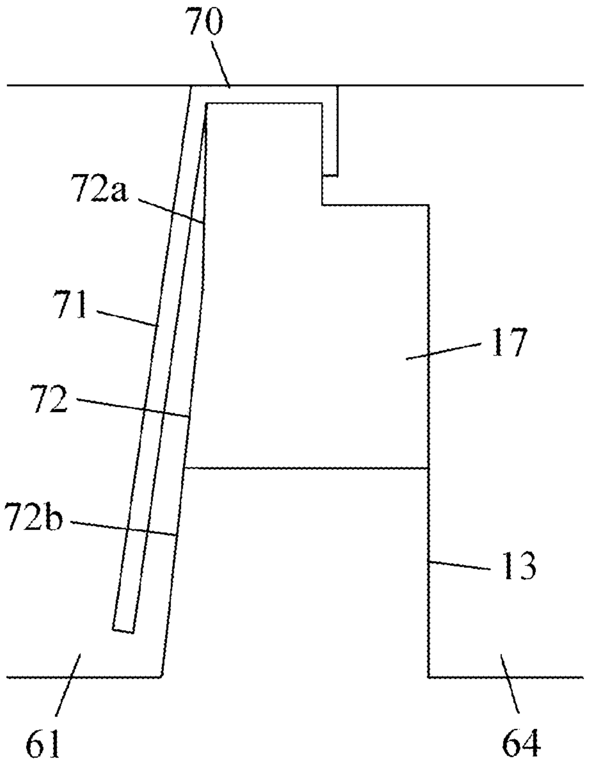
FIG. 13 is a cross-sectional view illustrating an initial state of the valve employed in the example.

As illustrated in FIGS. 2, 4, and 5, a first oil passage 17 is formed in the partition wall 13. The first oil passage may be formed in the vane. As illustrated in FIG. 4, a valve 70 is provided in the first oil passage 17. As illustrated in FIG. 13, the valve 70 includes a valve body 71 and a valve seat 72. As illustrated in FIGS. 12 and 13, the valve body 71 is a leaf spring. As illustrated in FIG. 13, the valve seat 72 includes two inclined surfaces 72*a* and 72*b* formed on the partition wall 13. The valve 70 increases the distortion of the valve body 71 by making an inclination angle of one slope 72*a* different from an inclination angle of the other slope 72*b*.

The valve 70 has a function of changing a flow rate of oil passing through the first oil passage 17 in one direction according to a load. The "oil passing through the first oil passage 17 in one direction" means oil that moves from the first oil chamber 61 to the fourth oil chamber 64 via the first oil passage 17 and oil that moves from the third oil chamber 63 to the second oil chamber 62 via the first oil passage 17. The "flow rate of oil" means an amount of oil passing through the first oil passage 17 within a unit time. The "load" means a force for rotating the rotor 20 in one direction, that is, the clockwise direction in FIGS. 1 and 9, or a force for rotating the cylinder 10 in the opposite direction, that is, the counterclockwise direction in FIGS. 1 and 9. By "change" is meant that the flow rate of the oil is reduced as the load increases.

Figure 14:
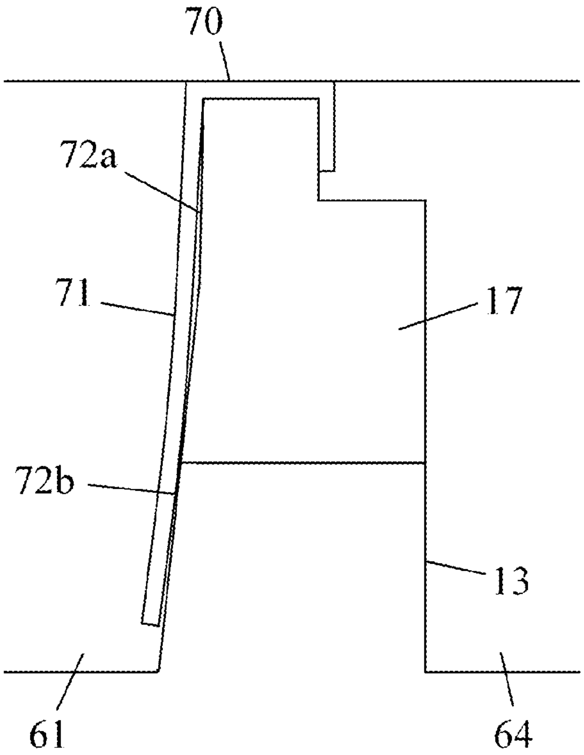
FIG. 14 is a cross-sectional view for explaining an operation of the valve employed in the example.
Figure 15:
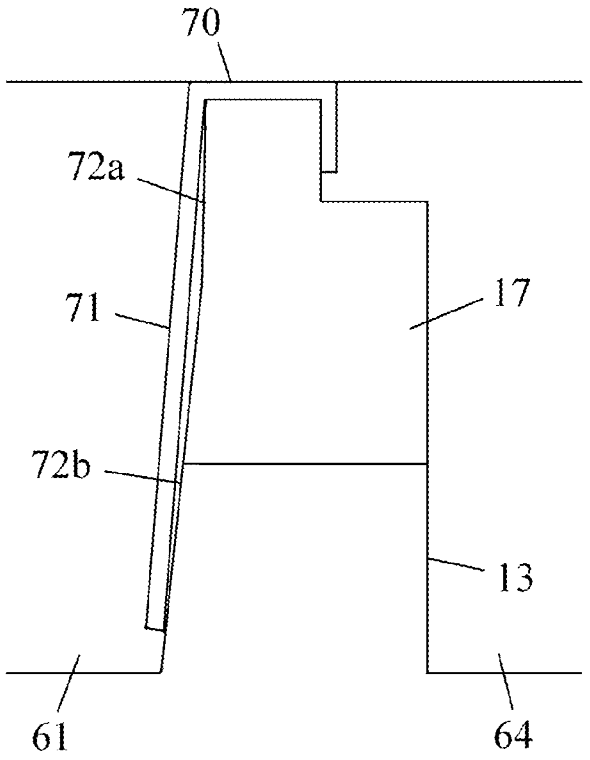
FIG. 15 is a cross-sectional view for explaining the operation of the valve employed in the example.

The pressure of the oil acting on the valve body 71 increases as the load increases. However, a restoring force of the valve body 71 becomes a resistance to the pressure of the oil. Therefore, according to the valve 70, when the load is large, the valve body 71 does not close the first oil passage 17, and the valve body 71 is greatly deformed to reduce an opening degree of the valve 70 as illustrated in FIG. 14. On the other hand, when the load is small, a deformation amount of the valve body 71 decreases as illustrated in FIG. 15, and thus the opening degree of the valve 70 increases. As a result, this valve 70 makes it possible to substantially fix the operation time, i.e. the time required for the rotor 20 to rotate in one direction at a constant rotation angle or for the cylinder 10 to rotate in the opposite direction at a constant rotation angle, even if the load changes.

Figure 16:
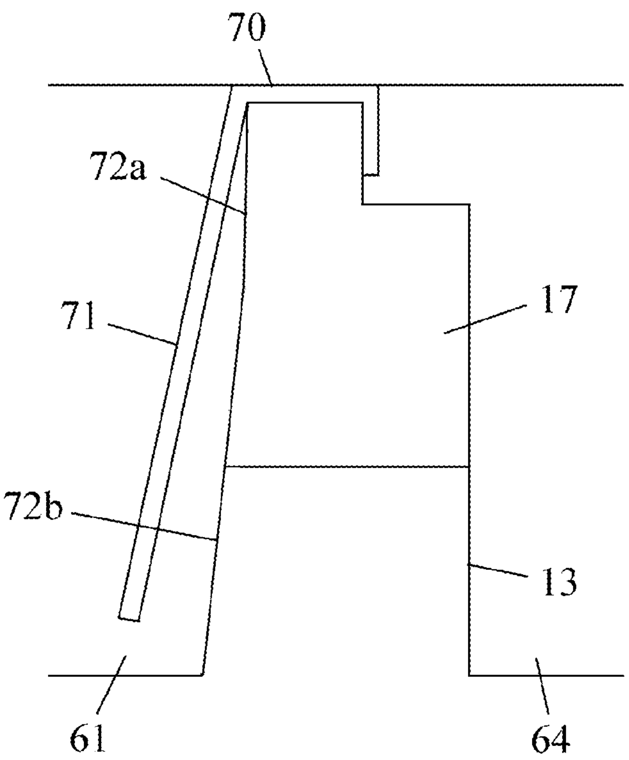
FIG. 16 is a cross-sectional view for explaining the operation of the valve employed in the example.

When the oil moves from the fourth oil chamber 64 to the first oil chamber 61 via the first oil passage 17 and the oil moves from the second oil chamber 62 to the third oil chamber 63 via the first oil passage 17, as illustrated in FIG. 16, the valve body 71 is greatly deformed by the pressure of the oil, and the opening degree of the valve 70 becomes larger than the initial state illustrated in FIG. 13. Therefore, the valve 70 can reduce the resistance of the oil acting on the rotor 20 rotating in the opposite direction or the cylinder 10 rotating in one direction.

Figure 17:
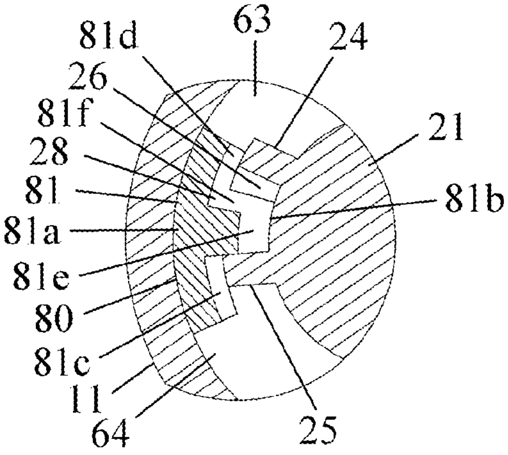
FIG. 17 is a cross-sectional view of a check valve employed in an example.
Figure 18:
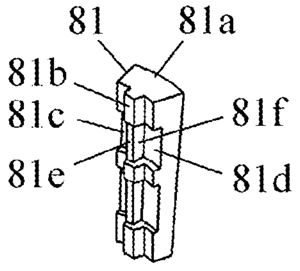
FIG. 18 is a perspective view of a valve body of the check valve employed in the example.
Figure 19:
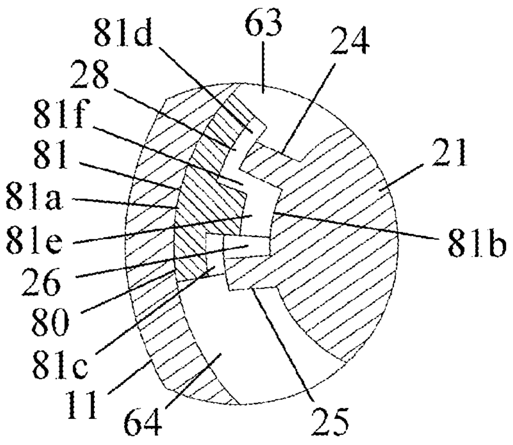
FIG. 19 is a cross-sectional view for explaining an operation of the check valve employed in the example.

As illustrated in FIGS. 17 and 19, a second oil passage 28 is formed in the vane 24. The second oil passage is formed in the partition wall or the vane in which the first oil passage is not formed. The second oil passage 28 includes a combination of grooves 81*c* to 81*f* formed in the valve body 81 and a groove 26 formed in the holding portion 25. As illustrated in FIGS. 17 and 19, a check valve 80 is provided in the second oil passage 28. The check valve 80 includes the valve body 81. As illustrated in FIG. 18, the valve body 81 has an arc-shaped main body portion 81*a* and a protruding portion 81*b* protruding from the main body portion 81*a*. The main body portion 81*a* includes two grooves 81*c* and 81*d* formed on the inner surface, and the protruding portion 81*b* includes a groove 81*e* formed at a tip and a groove 81*f* formed on one side surface. As illustrated in FIGS. 17 and 19, the main body portion 81*a* is disposed between the peripheral wall 11 and the holding portion 25. The protruding portion 81*b* is disposed in the groove 26 formed in the holding portion 25. Since there is play between the groove 26 and the protruding portion 81*b*, the valve body 81 can move in a circumferential direction. The main body portion 81*a* of the valve body 81 preferably has elasticity. This is because the gap formed between the peripheral wall 11 and the valve body 81 can be sealed by the elasticity of the main body portion 81*a*.

In the check valve 80, when the rotor 20 rotates in one direction, that is, the clockwise direction in FIGS. 1 and 9, or when the cylinder 10 rotates in the opposite direction, that is, the counterclockwise direction in FIGS. 1 and 9, as illustrated in FIG. 17, the protruding portion 81*b* of the valve body 81 comes into contact with one side surface of the groove 26 of the holding portion 25 to close the second oil passage 28, and when the rotor 20 rotates in the opposite direction, that is, the counterclockwise direction in FIGS. 1 and 10, or when the cylinder 10 rotates in one direction, that is, the clockwise direction in FIGS. 1 and 10, as illustrated in FIG. 19, the protruding portion 81*b* of the valve body 81 comes into contact with the other side surface of the groove 26 of the holding portion 25 to open the second oil passage 28. In the rotary damper according to the example, since the gap between the partition wall 13 and the shaft portion 21 is sealed by the elastic body 40, the oil does not flow out from the gap between the partition wall 13 and the shaft portion 21. However, since the oil can pass through the two oil passages, that is, the first oil passage 17 and the second oil passage 28, it is possible to reduce the resistance of the oil acting on the rotor 20 or the cylinder 10 when the rotor 20 rotates in the opposite direction or the cylinder 10 rotates in one direction.

As illustrated in FIG. 11, a method of manufacturing the rotary damper according to the example comprises the steps of forming the space 50 formed by a combination of the first recess 16 and the second recess 27 by facing the opening of the second recess 27 to the opening of the first recess 16, and inserting the elastic body 40 into the space 50 without compressing the elastic body. As illustrated in FIG. 4, in this step, most of the elastic body 40 is accommodated in the first recess 16, and a part of the elastic body 40 protruding from the first recess 16 is accommodated in the second recess 27, so that the elastic body 40 is easily attached.

Figure 20:
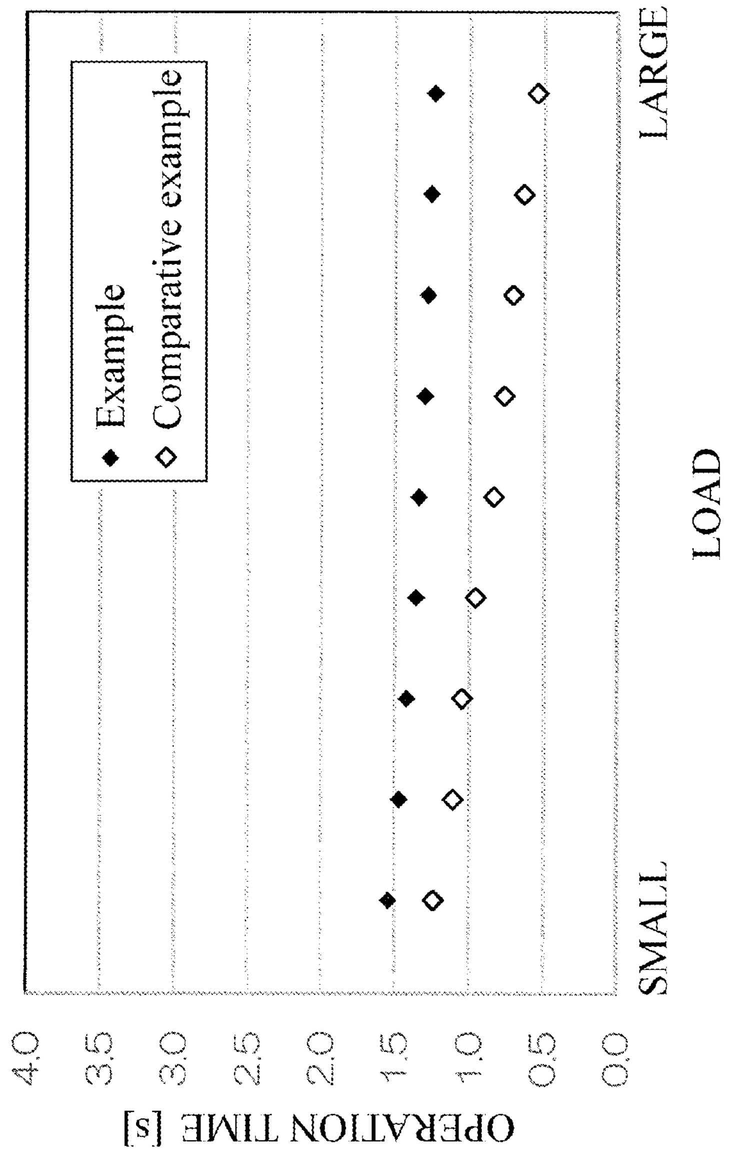
FIG. 20 is a graph illustrating a relationship between an operation time and a load.

FIG. 20 is a graph illustrating a relationship between an operation time and a load. A comparative example is different from the example in that the elastic body that seals the gap between the shaft portion and the partition wall is not provided.

As illustrated in this graph, in the example, a width of change in the operation time caused by the change in the load is smaller than that in the comparative example. In this experiment, a difference between the maximum value and the minimum value of the operation time of the comparative example was about 0.75 seconds, whereas that of the example was about 0.25 seconds, which was about ⅓ of that of the comparative example. This result indicates that the oil can be supplied to the valve in the example as compared with the comparative example, and the example demonstrates that the oil can be prevented from flowing out from the gap between the partition wall and the shaft portion.

The invention claimed is:

1. A rotary damper comprising:
- a cylinder having a partition wall;
- a rotor having a shaft portion opposing the partition wall;
- a first recess formed on a distal end surface of the partition wall;
- an elastic body installed in the first recess and closely contacting the shaft portion to seal a gap between the partition wall and the shaft portion; and
- a second recess formed in a part of an outer peripheral surface of the shaft portion not opposing the distal end surface of the partition wall during operation, and forming a space into which the elastic body can be inserted without being compressed by facing an opening of the second recess to an opening of the first recess during assembly, wherein the second recess is positioned to not oppose the first recess during operation.

2. The rotary damper according to claim 1 further comprising:
- a vane protruding from the shaft portion;
- a first oil passage formed in the partition wall or the vane; and
- a valve that changes a flow rate of oil passing through the first oil passage in one direction according to a load.

3. The rotary damper according to claim 2 further comprising:
- a second oil passage formed in the partition wall or the vane in which the first oil passage is not formed; and
- a check valve provided in the second oil passage.

4. A method of manufacturing a rotary damper comprising a cylinder having a partition wall; a rotor having a shaft portion opposing the partition wall; a first recess formed on a distal end surface of the partition wall; an elastic body installed in the first recess and closely contacting the shaft portion to seal a gap between the partition wall and the shaft portion; and a second recess formed in a part of an outer peripheral surface of the shaft portion not opposing the distal end surface of the partition wall during operation, the method comprising the steps of:
- forming a space consisting of a combination of the first recess and the second recess by facing an opening of the second recess to an opening of the first recess, and
- inserting the elastic body into the space without compression.

* * * * *